(12) United States Patent
Kwilosz

(10) Patent No.: US 6,513,550 B1
(45) Date of Patent: Feb. 4, 2003

(54) TWO-PIECE CAP FOR A VENT HOSE

(75) Inventor: Mark J. Kwilosz, Frankfort, IL (US)

(73) Assignee: Illinois Took Works Inc., Glenview, IL (US)

( * ) Notice: Subject to any disclaimer, the term of this patent is extended or adjusted under 35 U.S.C. 154(b) by 0 days.

(21) Appl. No.: 09/917,079

(22) Filed: Jul. 27, 2001

(51) Int. Cl.[7] .............................................. B65D 59/00
(52) U.S. Cl. ..................... 138/96 R; 138/89; 220/366.1; 220/374; 137/587
(58) Field of Search .............................. 138/96 R, 96 T, 138/89; 137/583, 587; 220/366.1, 374, 203.29

(56) References Cited

U.S. PATENT DOCUMENTS

| | | |
|---|---|---|
| 2,494,679 A | 1/1950 | Ward, Jr. ..................... 220/372 |
| 3,454,182 A * | 7/1969 | Morton ..................... 137/513.5 |
| 4,147,096 A | 4/1979 | Caswell ........................ 454/20 |
| 4,190,087 A * | 2/1980 | Herman et al. ............ 138/96 R |
| 4,392,584 A | 7/1983 | Bauer .......................... 220/374 |
| 4,398,453 A | 8/1983 | Wilkerson ................... 454/367 |
| 4,689,281 A | 8/1987 | Dandona et al. .............. 429/89 |
| 4,713,029 A | 12/1987 | Ford ............................ 440/89 |
| 4,913,303 A | 4/1990 | Harris .................... 220/203.21 |
| 4,921,071 A | 5/1990 | Lonnborg et al. ............ 184/6.4 |
| 4,936,351 A * | 6/1990 | Wells et al. ................ 138/104 |
| 4,971,249 A | 11/1990 | Tam et al. ................... 239/119 |
| 5,024,345 A * | 6/1991 | Deweerdt ..................... 138/89 |
| 5,273,466 A | 12/1993 | Thompson .................... 440/88 |
| 5,307,994 A | 5/1994 | Hieronymus ................. 239/340 |
| 5,325,977 A * | 7/1994 | Haynes et al. ............... 215/307 |
| 5,388,611 A | 2/1995 | Harris ......................... 137/588 |
| 5,402,818 A | 4/1995 | Kasugai et al. ............. 137/198 |
| 5,464,469 A | 11/1995 | Close et al. ................... 96/220 |
| 5,503,199 A | 4/1996 | Whitley, II et al. ......... 141/312 |
| 5,524,662 A | 6/1996 | Benjey et al. ................. 137/43 |
| 5,603,349 A | 2/1997 | Harris ......................... 137/588 |
| 5,618,214 A | 4/1997 | Wyss et al. .................... 440/88 |
| 5,640,999 A * | 6/1997 | Wood ........................... 138/89 |
| 5,762,093 A | 6/1998 | Whitley, II ................. 137/199 |
| 5,816,430 A | 10/1998 | Gruber ..................... 220/367.1 |
| 5,979,505 A * | 11/1999 | Drechsel ...................... 138/32 |
| 6,003,715 A | 12/1999 | Harris ......................... 220/277 |
| 6,015,444 A * | 1/2000 | Craft et al. ................. 220/371 |
| 6,152,114 A | 11/2000 | Kleppner .................... 123/514 |

* cited by examiner

*Primary Examiner*—Patrick Brinson
(74) *Attorney, Agent, or Firm*—Pitney, Hardin, Kipp & Szuch LLP

(57) ABSTRACT

The vent hose cap includes a base and a head. The base includes cylindrical walls and partially cylindrical interior skirt sections. The interior of the skirt sections form an aperture for receiving a vent hose, while the space defined between the cylindrical walls and the skirt sections, including the gaps between the skirt sections, define a longitudinal gas passageway. Radial slots formed in the base provide gas communication from the interior of the gas vent hose to the longitudinal gas passageway. The cap includes a barbed shaft with an H-shaped cross-section for insertion into the base and through the interior of the vent hose.

10 Claims, 5 Drawing Sheets

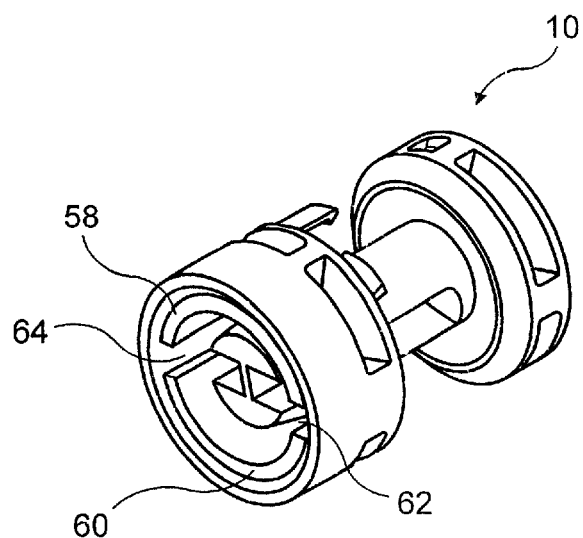
F I G. 1
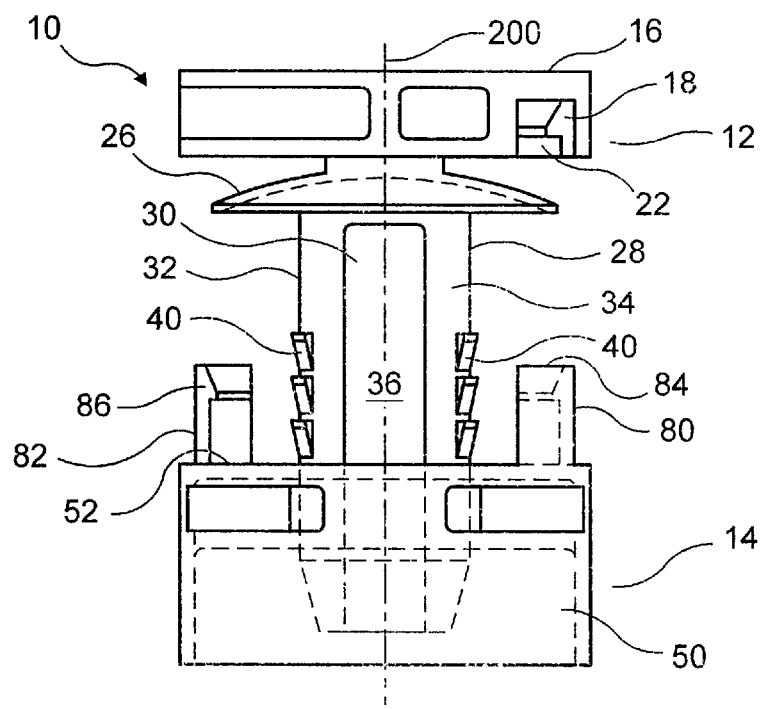
F I G. 2

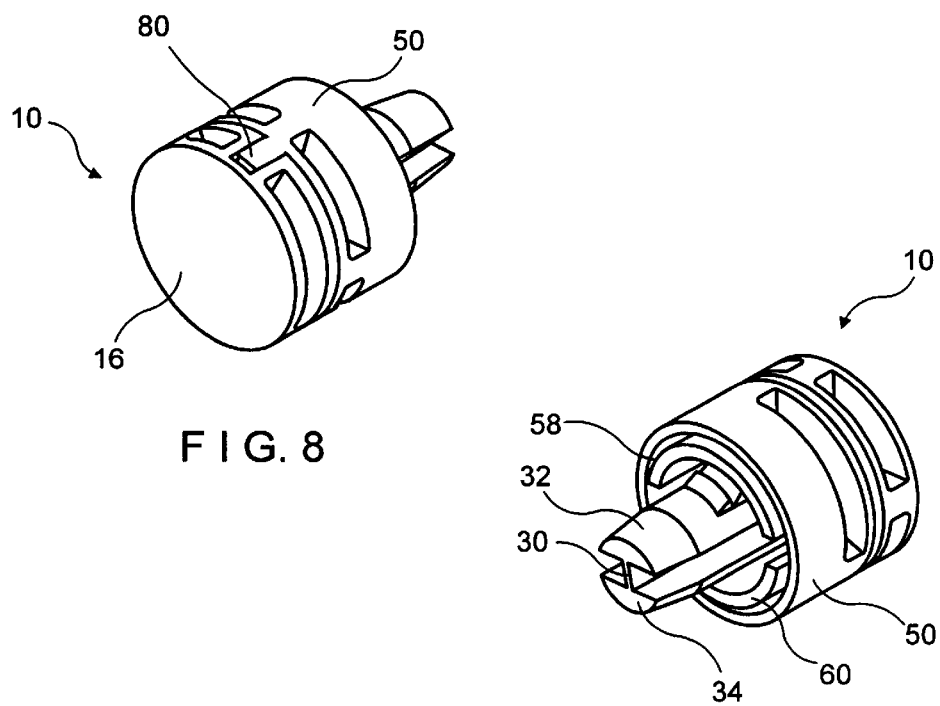
FIG. 8
FIG. 9
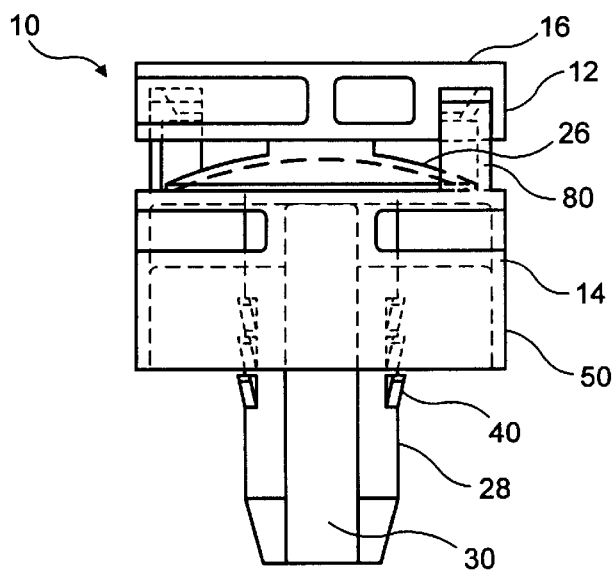
FIG. 10

TWO-PIECE CAP FOR A VENT HOSE

BACKGROUND OF THE INVENTION

1. Field of the Invention

The present invention relates to a cap, particularly a two-piece cap, which is used to prevent any splashing into a vent hose while allowing gas to escape freely from the vent hose.

2. Description of the Prior Art

In the prior art, it is known to shield a vent hose in order to at least minimize any foreign objects or liquid from entering the vent hose while allowing gas to escape freely from the vent hose.

However, much of the prior art was not effective in that many caps were not radially shielded. Additionally, some prior art designs involved less than satisfactory manufacturing processes in that undercuts were required in the tool steel to create the part thereby causing difficulty in ejecting the part from the mold.

OBJECTS AND SUMMARY OF THE INVENTION

It is therefore an object of the present invention to provide a cap for a vent hose which provides substantially complete radial shielding to prevent liquids or solids from entering into the outlet of the vent hose.

It is therefore a further object of the present invention to provide a cap for a vent hose which allows for the escape of gases through the outlet of the vent hose.

It is therefore a still further object of the present invention to provide a cap for a vent hose which can be simply and intuitively installed.

It is therefore a still further object of the present invention to provide a cap for a vent hose which can be simply and economically manufactured.

These and other objects are attained by providing a vent cap which includes two pieces—a base and a head—that are formed in a single molding operation. After the molding operation, a pre-drive operation configures the two pieces together. The base is attached to the head with a snap fit. The base is formed to surround the hose radially. The head seal the hose on the top in the axial direction with an umbrella. The head also retains the cap on the hose with barbs located axially along the shaft. Slots in the shaft and base allow gas to escape while surrounding the hose from any liquid splash or solid foreign objects.

DESCRIPTION OF THE DRAWINGS

Further objects and advantages of the invention will become apparent from the following description and claims, and from the accompanying drawings, wherein:

FIG. 1 is a perspective view of the vent cap of the present invention, shown in the as-molded configuration.

FIG. 2 is a first side plan view, partially in phantom, of the vent cap of the present invention, shown in the as-molded configuration.

FIG. 8 is a top perspective view of the vent cap of the present invention, shown in the assembled configuration.

FIG. 9 is a bottom perspective view of the vent cap of the present invention, shown in the assembled configuration.

FIG. 10 is a first side plan view, partially in phantom, of the vent cap of the present invention, shown in the assembled configuration.

DETAILED DESCRIPTION OF THE PREFERRED EMBODIMENT

Figure 3:
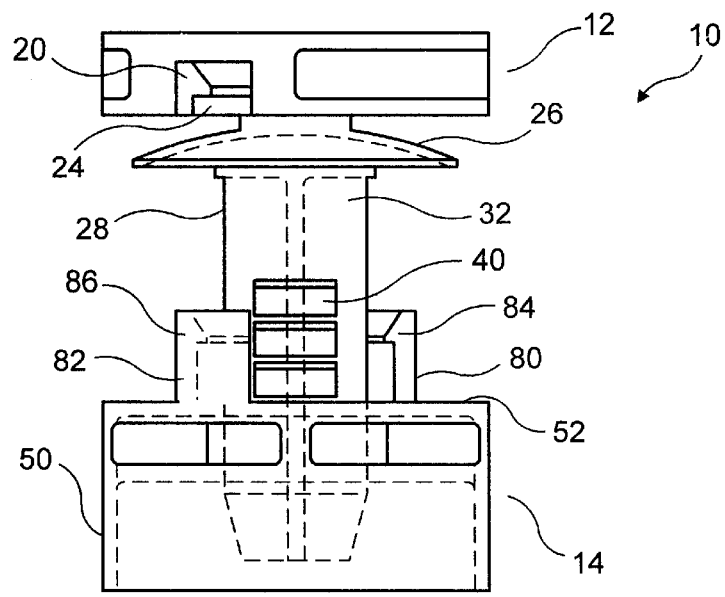
FIG. 3 is a second side plan view,. partially in phantom, of the vent cap of the present invention, at a view orthogonal to the view of FIG. 2, shown in the as-molded configuration.
Figure 4:
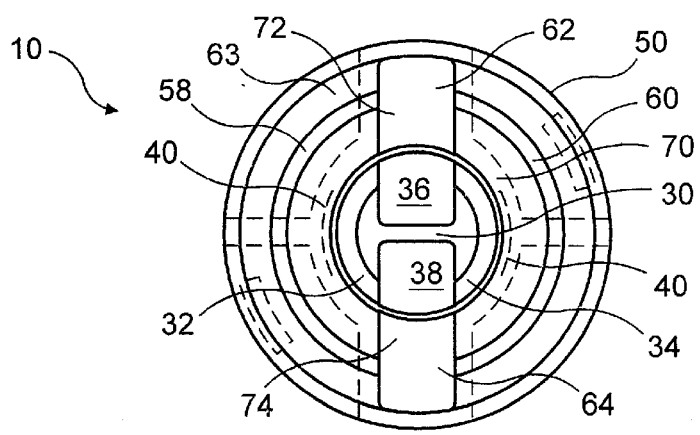
FIG. 4 is a bottom plan view of the vent cap of the present invention, shown in the as-molded. configuration.

Referring now to the drawings in detail wherein like numerals indicate like elements throughout the several views, one sees that FIGS. 1–4 illustrate the as-molded configuration of vent hose cap 10 of the present invention, including head 12 and base 14. Vent hose cap 10 is typically formed of molded nylon 6/6, but those skilled in the art will recognize a range of equivalent substitutions. Head 12, formed about longitudinal axis 200, includes disk-shaped handle section 16 with two detent grooves 18, 20 with detent lips 22, 24 formed on the periphery thereof. Downwardly facing umbrella-shaped seal 26 is formed rotationally symmetrically immediately below handle section 16. Shaft 28 extends downwardly from downwardly facing umbrella-shaped seal 26. As shown in FIGS. 4 and 9 and other figures, shaft 28 includes an H-shaped cross section with cross member 30 joining two partially circumferential members 32, 34. Gas passageways 36, 38 are therefore formed between partially circumferential members 32, 36 and separated by cross member 30. The outer surfaces of partially circumferential members 32, 34 include upwardly directed oblique barbs 40 for engaging and retaining the interior of hose 100 (see FIG. 7).

Figure 7:
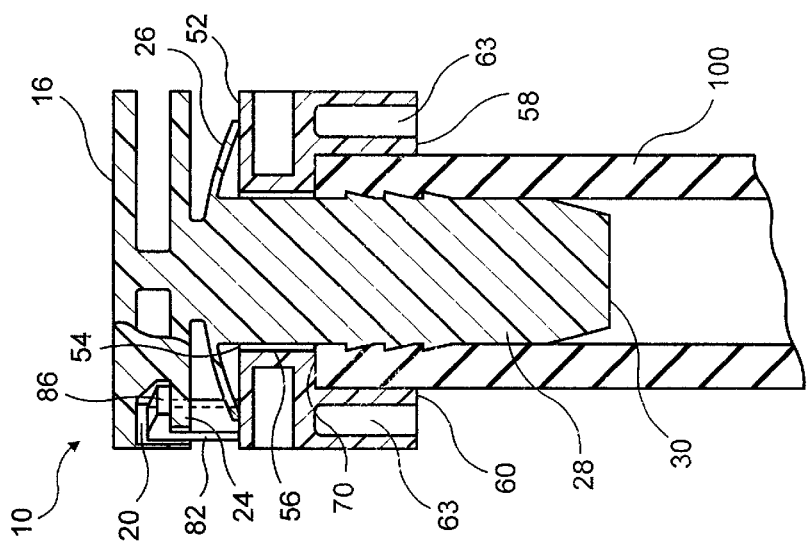
FIG. 7 is a cross-sectional view of the vent cap of the present invention, shown along plane 7—7 of FIG. 6.
Figure 6:
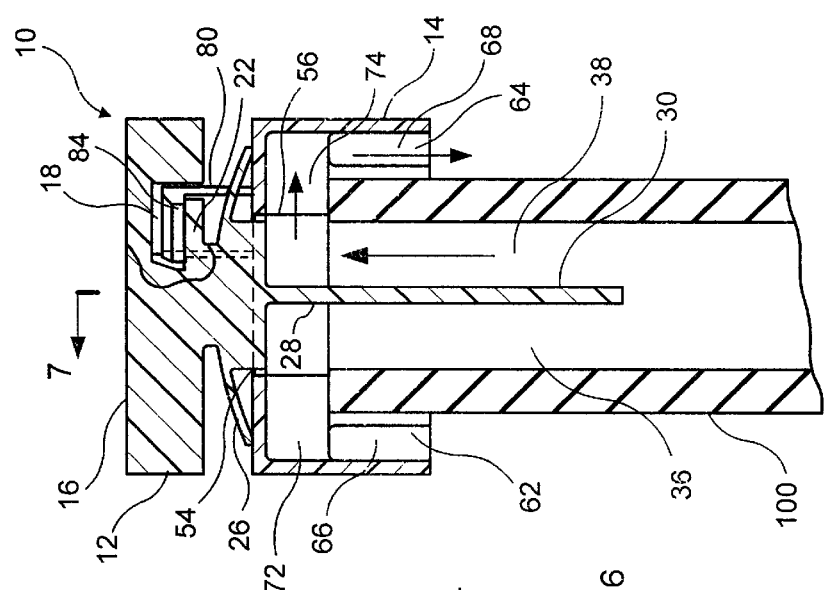
FIG. 6 is a cross-sectional view of the vent cap of the present invention, shown along plane 6—6 of FIG. 5.
Figure 5:
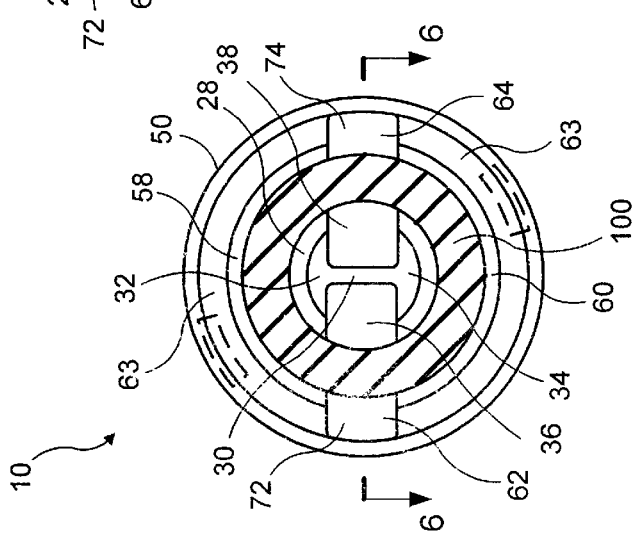
FIG. 5 is a bottom plan view of the vent cap of the present invention, shown in the installed position.

Base 14 is formed by exterior cylindrical sidewall 50. As shown in FIGS. 6 and 7, the upper surface 52 of base 14 includes mouth 54 of passageway 56 through which shaft 28 extends. Passageway 56 is formed along longitudinal axis 200. Interior cylindrical skirt sections 58, 60 are formed concentrically inward from exterior cylindrical sidewall 50 about longitudinal axis 200 in a lower portion of base 14, thereby forming cylindrical gap 63. Circumferential gaps 62, 64 are formed between interior cylindrical skirt sections 58, 60 thereby forming longitudinal gas passageways 66, 68 of FIG. 6. The radius of curvature of interior cylindrical skirt sections 58, 60 are chosen to engage hose 100 as shown in FIG. 7. Inverted circular ledge 70 is formed at the transition from passageway 56 to the interior of cylindrical skirt sections 58, 60 thereby forming a stop against which hose 100 seats as shown in FIG. 7. Moreover, as shown in FIGS. 5 and 6, radially oriented slots 72, 74 are formed are formed above inverted circular ledge 70 to provide communication between gas passageways 36, 38 and longitudinal gas passageways 66, 68 and further to cylindrical gap 63, leading to atmosphere. The gas communication path from the interior of hose 100 to atmosphere therefore includes two 90° turns with exterior cylindrical sidewall 50 maintaining radial shielding. This allows the gas from the interior of hose 100 to escape while minimizing or virtually eliminating the possibility of liquids or solids being introduced through the gas communication path into the interior of hose 100.

Figure 11:
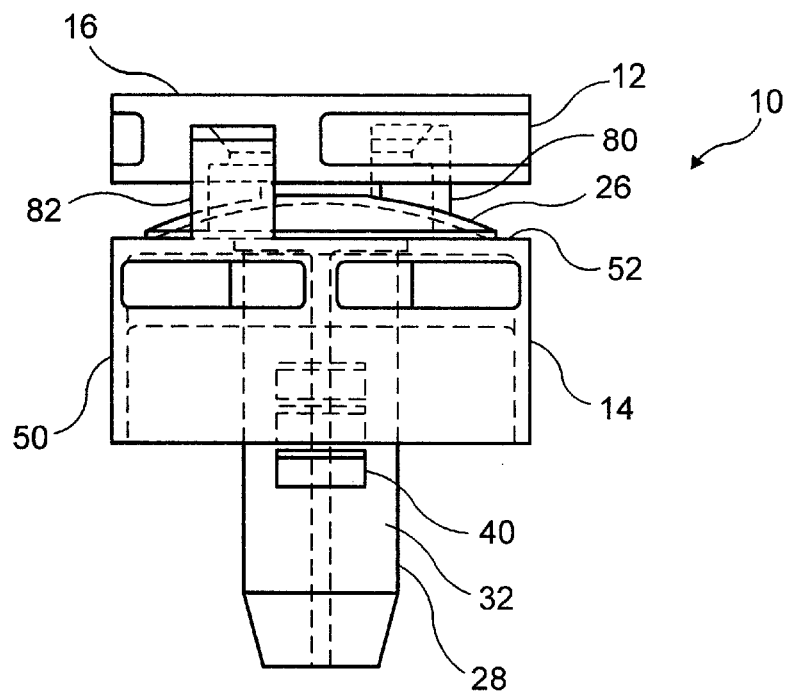
FIG. 11 is a second side plan view, partially in phantom, orthogonal to the first side plan view of FIG. 10, of the vent cap of the present invention, shown in the assembled configuration.
Figure 12:
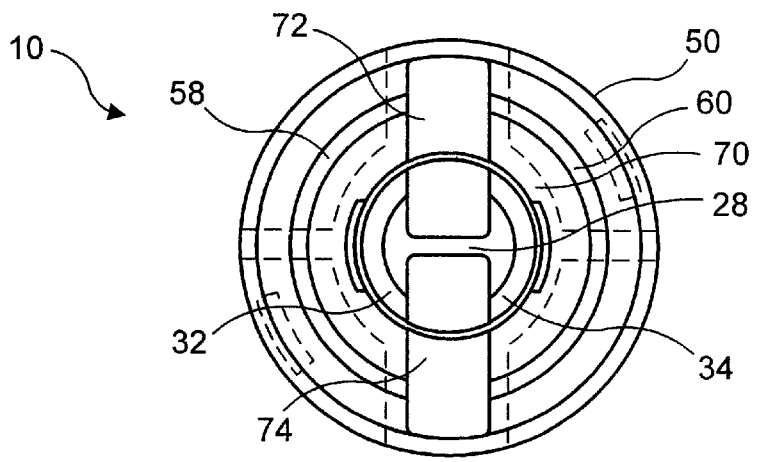
FIG. 12 is a bottom plan view of the vent cap of the present invention, shown in the assembled configuration.

Detent tabs 80, 82 rise from upper surface 52 of base 14 and further include inwardly extending detent prongs 84, 86. As shown in FIGS. 10 and 11, in the installed position, head 12 is driven downwardly so that detent prongs 84, 86 of base 14 snap detent engage detent lips 22, 24 of detent grooves 18, 20 of handle section 16. In this installed position, downwardly facing umbrella-shaped seal 26 is urged downwardly against upper surface 52 of base 14 forming a sealing relationship and preventing any gas from being vented through passageway 56.

After the initial molding, the vent hose cap 10 is typically in the as-molded configuration of FIGS. 1–4. A pre-driving operation drives hard downwardly to the position of FIGS. 8–12. The user is thereafter typically able to position shaft 28 into the opening of hose 100 and drive vent hose cap 10 to the installed position shown in FIGS. 6 and 7 wherein hose 100 seats against inverted circular ledge 70 and barbs 40 engaging the interior of hose 100.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A vent hose cap including:
   a base including outer walls, a passageway formed inwardly from said outer walls, an aperture formed inwardly from said passageway for engaging a hose, a gas communication path formed from said aperture to said passageway, and an opening formed along a common axis with said aperture; and
   a head including a shaft for insertion through said opening and into the hose engaged by said base.

2. The vent hose cap of claim 1 wherein said opening joins said aperture, said opening being smaller than said aperture thereby forming a circular ledge which acts as a stop for the hose.

3. The vent hose cap of claim 2 wherein said outer walls are cylindrical and wherein said passageway is separated from said aperture by an at least partially cylindrical interior skirt.

4. The vent hose cap of claim 3 wherein said at least partially cylindrical interior skirt is formed of cylindrical sections with circumferential gaps therebetween, said circumferential gaps forming at least part of said gas communication path.

5. The vent hose cap of claim 4 wherein said head includes a seal which is urged against said base, thereby preventing a gas communication path from forming through said opening.

6. The vent hose cap of claim 5 wherein said head includes a first detent element and said base includes a second detent element, said first detent element engaging said second detent element in an installed position of the vent hose cap.

7. The vent hose cap of claim 6 wherein said first detent element includes a detent depression formed in said head and said second detent element includes a tab rising from said base and terminating in a detent prong which engages said detent depression.

8. The vent hose cap of claim 7 wherein said shaft includes barbs for engaging the hose.

9. The vent hose cap of claim 8 wherein said shaft has a H-shaped cross section with a cross member separating two partially circumferential members, said barbs being formed on said partially circumferential members and said gas communication path including a space between said partially circumferential members.

10. The vent hose cap of claim 9 wherein said base and said head are contemporaneously molded as a single piece and said shaft of said head is inserted through said opening prior to use of the vent hose cap.

\* \* \* \* \*